AUTOMATIC FREQUENCY CONTROL

Filed May 1, 1951 4 Sheets-Sheet 1

INVENTOR
Lowell E. Norton
BY
ATTORNEY

April 16, 1957 L. E. NORTON 2,789,223

AUTOMATIC FREQUENCY CONTROL

Filed May 1, 1951 4 Sheets-Sheet 2

INVENTOR
Lowell E. Norton
BY J. L. Whittaker
ATTORNEY

INVENTOR
Lowell E. Norton
BY J. L. Whittaker
ATTORNEY

April 16, 1957 L. E. NORTON 2,789,223

AUTOMATIC FREQUENCY CONTROL

Filed May 1, 1951 4 Sheets-Sheet 4

INVENTOR
Lowell E. Norton
BY J. L. Whittaker
ATTORNEY

United States Patent Office 2,789,223

Patented Apr. 16, 1957

2,789,223

AUTOMATIC FREQUENCY CONTROL

Lowell E. Norton, Princeton, N. J., assignor to Radio Corporation of America, a corporation of Delaware Application May 1, 1951, Serial No. 224,002

7 Claims. (Cl. 250—36)

This invention relates to methods and systems for effecting frequency-stabilization of oscillators, particularly oscillators operating in the microwave or centimeter wave region of the frequency spectrum.

At the lower radio-frequencies, generation of uniformly spaced and stable frequencies for multi-channel operation is usually accomplished by arrangements in which a plurality of crystals respectively ground to the required different channel frequencies or subharmonics thereof are selectively connectable in an oscillator circuit. It is not feasible by use of frequency multipliers or harmonic generators in such arrangements to obtain stable equispaced frequencies in the centimeter or microwave region because suitable circuitry for the required high order of harmonic generation is complex, cumbersome, and not very satisfactory, and because any frequency errors in the fundamental crystal frequencies are greatly increased by the high order multiplication required to reach the microwave frequency region.

As disclosed in various copending applications including some hereinafter identified, various arrangements are now known for generating a microwave frequency stabilized from a selected absorption line of a gas. However, such gas-line stabilized frequencies and their spacing in the spectrum do not provide the frequency and interfrequency relationships necessary for equal channel spacing or for operation in arbitrarily assigned regions of the spectrum. In brief, such prior practices and techniques do not provide for stabilized multi-channel operation at microwave frequencies.

A principal object of the present invention is to provide methods and systems for generation of microwave oscillations which are stabilized at equispaced frequencies for multi-channel operation.

In accordance with the present invention, the channel spacing is provided by generating relatively low frequency oscillations whose frequency bears a simple numerical relation to the frequency difference between adjacent channels, which relation is adjustable in equal steps, as by frequency-multiplication or division, to afford the desired number of channels. These frequencies are selectively combined with oscillations produced by a microwave generator, frequency-stabilized from a gas-line or other high-Q standard, to provide any one of the stabilized microwave channel frequencies. Since, except by chance, none of the microwave channel frequencies bears a harmonic relation to any molecular resonance frequency of a gas, the required offset of the mean channel-frequency is provided by generating oscillations of fixed frequency corresponding with the offset and effectively combining them with the stabilized microwave oscillations and the channel-spacing oscillations.

More particularly, in some forms of the invention, the algebraic sum of the fixed offset frequency and the incrementally adjustable channel-spacing frequency is mixed with two harmonics, of adjacent order, of a microwave oscillator, the combining or mixing being in the feedback circuit of that oscillator, so to effect its stabilization at any selected one of the channel frequencies; in other forms of the invention, a phase-comparator maintains the frequency difference between a stabilized fixed frequency microwave oscillator and a separate channel-frequency oscillator equal to the aforesaid sum of the offset frequency and the incrementally adjustable channel-spacing frequency so to effect stabilization of the channel-frequency oscillator at any selected one of the channel frequencies.

In some forms of the invention, the frequency whose components include both the offset frequency and the channel-spacing frequency is provided by mixing the outputs of the offset frequency oscillator and the composite frequency oscillator and comparing the phase of a selected subharmonic of a product of the mixing with the phase of the channel-frequency oscillator. The output of the comparator is applied as a control voltage to maintain the frequency of the composite oscillator equal to the algebraic sum of the frequency of the offset oscillator and of a harmonic of the channel-frequency oscillator. In other forms of the invention, the algebraic sum of such frequencies is effected by combining the outputs of the offset frequency oscillator and an oscillator stabilized at a selected harmonic of the channel frequency oscillator.

The invention further resides in methods and systems having the features of novelty and utility hereinafter described and claimed.

For a more detailed understanding of the invention and for illustration of some embodiments thereof, reference is made to the accompanying drawings in which.

Figure 1:
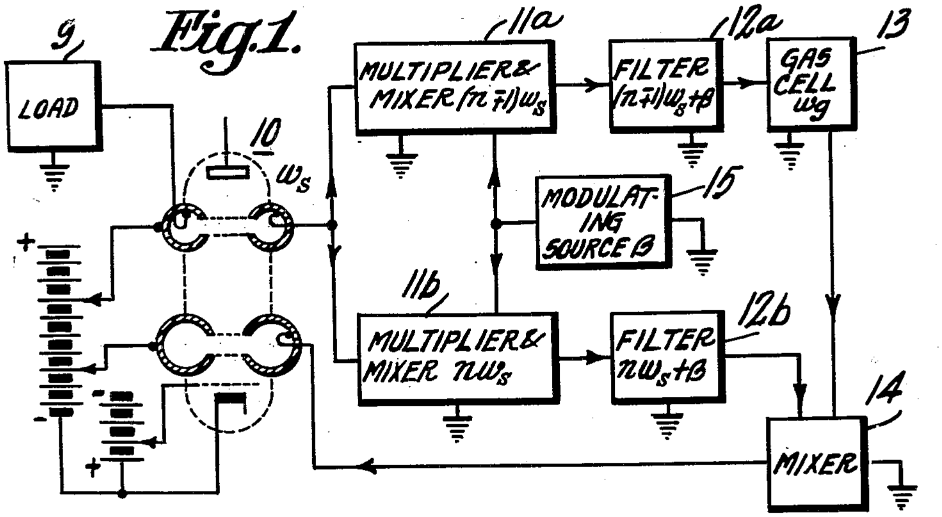
Fig. 1 is a block diagram of a multi-channel microwave system in which the offset and channel-spacing frequencies are introduced in the feedback loop of a gas-line stabilized oscillator.

Referring to Fig. 1, the output from a microwave generator 10, specifically a two-cavity klystron, is applied to a frequency multiplier mixer 11*a*, which for convenience at microwave frequencies may simply be a diode. There is also applied to mixer 11*a*, from a suitable source 15, an output of relatively low frequency B which, as later explained, incrementally is adjustable in equal steps. A filter 12*a* in the output circuit of mixer 11*a* is tuned, for example, to pass the first order sideband of the $(n+1)$st harmonic of the operating frequency $\omega_s$ of the klystron or equivalent. The first order sideband $[(n+1)\omega_s+B)]$ of this harmonic is much stronger than higher order sidebands and hence is the most useful. The output of the filter 12*a* is applied to a high-frequency standard 13 which specifically may be a chamber or cavity containing ammonia or other gas exhibiting molecular resonance at microwave frequencies. By way of specific example, and assuming the system is to provide 17 channels spaced 25 megacycles apart from 6800 to 7200 megacycles, the output from filter 12*a* may be at the frequency 21,285 megacycles which corresponds with the frequency of the 5,3 line of ammonia.

The output from the microwave generator 10 may be applied to a load 9, and is also applied to another frequency multiplier-modulator 11$b$ which may also for convenience be a crystal diode. The aforesaid incrementally adjustable low frequency B is also applied to mixer or modulator 11$b$. The filter 12$b$ in the output circuit of multiplier-modulator 11$b$ is tuned to pass the first order sideband $[n\omega_s+B]$ of the $n$th harmonic of operating frequency $\omega_s$ of generator 10.

The outputs of the filter 12$b$ and the gas cell 13 are applied to the mixer 14 and the resulting difference frequency $[(n+1)\omega_s+B]-[n\omega+B]$ is applied as feedback sustaining generation of oscillations by klystron 10.

This frequency is rigidly stabilized because the ouput from filter 12$a$ when applied to the gas at spectral line frequency undergoes rapid and steep phase shift for small changes in frequency due to the dispersion properties of the gas-absorption phenomenon.

In brief explanation of the phenomenon involved, various gases including $NH_3$, COS, $CH_3NH_2$ and $SO_2$ exhibit selective absorption in the microwave region of the frequency spectrum. As more fully described in copending applications including Serial No. 218,808, now Patent No. 2,743,368, issued April 24, 1956, at low pressures of the order of $10^{-2}$ millimeters of mercury, the absorption region breaks up into a plurality of lines each precisely corresponding with a particular frequency: for example, the 5,3 line of ammonia occurs, as above stated, at a frequency of 21,285 megacycles and at a pressure of $10^{-2}$ millimeters of mercury the effective Q is upwards of 40,000. Q's as high as 100,000 are readily available with the gas confined in a length of waveguide or in a resonant cavity for use as standard 13.

The impedance change of a resonant circuit or element in the neighborhood of its resonant frequency ($f$) may be expressed as:

$$(1) \qquad Z=Z_0\left(1-i2\frac{\Delta f}{f}Q\right)$$

where $Z_0$ has the dimensions of a resistance, Q has its usual significance, and $\Delta f$ is the incremental change of the impressed frequency.

The phase angle $\psi$ of the circuit or element near resonance may therefore be expressed as:

$$(2) \qquad \tan\psi=-2\frac{\Delta f}{f}Q$$

the angle being leading or lagging for opposite senses of deviation from frequency $f$.

Consequently when the frequency standard is a chamber or cavity containing gas exhibiting molecular resonance and so having a Q upwards of 50,000 or so, the phase angle $\psi$ of the equivalent impedance $Z$ varies rapidly with departure of the impressed frequency from the resonant frequency of the gas and in positive or negative sense depending upon the direction of the deviation.

In Fig. 1, the frequency impressed upon the gas cell very closely approximates $(n+1)$ times the output frequency $\omega_s$ of the oscillator so that general Equation 2 may be rewritten as $$(3) \qquad \tan\psi=2\frac{\Delta(n+1)\omega_s}{\omega_g}Q$$

where $\omega_g$ is the molecular resonant frequency of the gas.

As above explained, the difference-frequency in the output of mixer 14 includes the phase angle $\psi$ which extremely rapidly changes with deviation from the resonant frequency $\omega_g$ of the gas of the selectively impressed frequency $[(n+1)\omega_s+B]$. Thus, although the feedback loop of the oscillator is effectively closed at the operating frequency $\omega_s$ of the oscillator, the stabilization is effected at a substantially higher frequency closely approximating the $(n+1)$ harmonic. In consequence, the stiffness factor of the stabilization is increased by the order of the harmonic.

In the particular example above selected for purposes of explanation, the klystron 10 is frequency-controlled by a spectral line at a frequency of 21,285 megacycles, but the klystron is operating at the lower frequency $$\left(7000-\frac{B}{n+1}\right)\text{ megacycles}$$

In most cases, the frequency B includes two components; one equal to a fixed offset frequency $\Delta$ and the other incrementally adjustable in equal steps to provide the desired channel spacing. For the specific example selected for discussion the offset frequency $\Delta$ is 285 megacycles so that $$B=\pm m\alpha+285$$

Hence, $$\omega_0=\frac{21,285-285\pm m\alpha}{n+1}$$

Assuming that multiplier $n$ is selected as 2, then $$(4) \qquad \omega_s=\frac{21,000\pm m}{3}=7,000\pm\frac{m}{3}$$

The channel-spacing frequency $\alpha$ may be obtained from a fairly stable oscillator, for example a crystal-controlled oscillator, which for the particular example under discussion, operates at 75 megacycles so that the frequency $\omega_s$ of oscillator 10 is incrementally adjustable above and below the mean frequency of 7,000 megacycles in steps of 25 megacycles. For only 8 selected division ratios (1 through 8) or values of $m$, stabilized output frequencies of generator 10 are obtained at 6800, 6825, 6850, 6875, 6900, 6925, 6950, 6975, 7000, 7025, 7050, 7075, 7100, 7125, 7150, 7175 and 7200 megacycles/sec. The number of available channel frequencies is approximately twice the number of available division ratios because as appears from Equation 4, its second term is double valued and either the plus or minus value may be selected. The frequency stability of either or both of the sources of the component frequencies of B need not be particularly high since these frequencies are small compared to the mean channel frequency of 7,000 megacycles.

In general, with the gas cell 13 in circuit with the filter 12$a$, the oscillator 10 is stabilized at a selected one of the frequency relations $$(5) \qquad \omega_s=\frac{\omega_g}{n+1}\pm\frac{B}{n+1}$$

whereas if the gas cell is in circuit with the filter 12$b$, the oscillator is stabilized in accordance with $$(6) \qquad \omega_s=\frac{\omega_g}{n}\pm\frac{B}{n}$$

Figure 2:
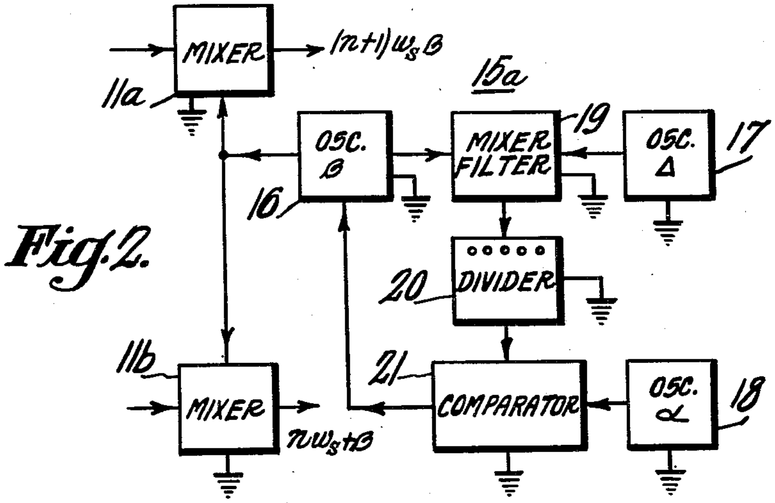
Figs. 2 and 3 illustrate modifications of part of the system of Fig. 1.
Figure 3:
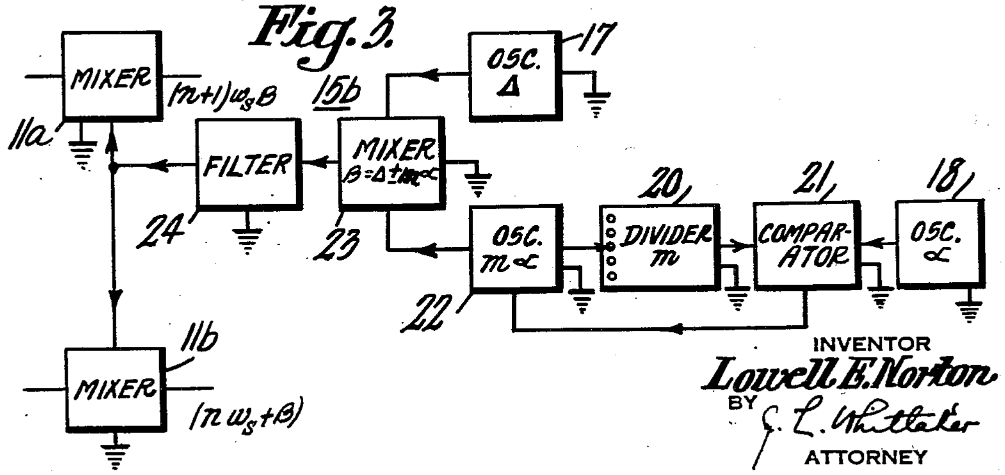

In Figures 2 and 3 are shown two arrangements 15A, 15B for use as source 15 of Fig. 1 to provide a frequency B which includes two terms, one corresponding with a fixed offset frequency $\Delta$ and the other with an incrementally adjustable channel-spacing frequency $\alpha$.

In the arrangement 15A shown in Fig. 2, the output frequency B of the oscillator 16 is applied to a mixer-filter 19 to which is also applied the output of oscillator 17 generating oscillations of frequency $\Delta$. The algebraic sum of these frequencies (arithmetic sum or difference depending upon the filter used) is applied to a frequency-divider 20 adjustable to select successive subharmonics of the sum or difference frequency. The outputs of the frequency-divider 20 and of oscillator 18 generating oscillations of frequency $\alpha$ are applied to a phase-comparator 21 (which may be of type shown in copending application Serial No. 218,807) to provide a control signal voltage applied for stabilization of frequency of oscillator 16. If oscillator 16 frequency is tuned to either $\Delta+m\alpha$ or $\Delta-m\alpha$ control will occur. Both control conditions are stable. Hence it is only necessary to pretune, approximately, oscillator 16 to any of the desired frequencies $\Delta\pm m\alpha$, and then to select the particular operating frequency with a switch which adjusts both oscillator 16 and selects the value of division, $m$, for divider 20. Precise control will then occur by action of the control voltage from the phase comparator. Thus in terms of the offset and channel-spacing components of frequency B, the Equations 5 and 6 may be rewritten as $$\omega_s=\frac{\omega_g}{n\pm 1}\pm\left(\frac{\Delta}{n\pm 1}\pm\frac{m\alpha}{n\pm 1}\right) \tag{7}$$

$$\omega_s=\frac{\omega_g}{n}\pm\left(\frac{\Delta}{n}\pm\frac{m\alpha}{n}\right) \tag{8}$$

respectively.

In the system 15B (Fig. 3) for providing a selected one of the frequencies $B=\Delta\pm m\alpha$, the outputs of the oscillators 17 and 22, respectively generating the frequencies $\Delta$ and $m\alpha$, are applied to a mixer 23, the filter 24 selecting the desired component $(\Delta+m\alpha)$ or $(\Delta-m\alpha)$ of that mixer output for impression upon the feedback loop of the generator 10. For step by step adjustment of the channel-spacing component $m\alpha$ of frequency B, the output of the oscillator 22 is impressed upon a frequency divider 20 whose output in turn is impressed upon one input circuit of a phase-comparator 21. Upon the other input circuit of the phase-comparator is impressed the output of oscillator 18 generating oscillations of frequency $\alpha$. The reversible-polarity, unidirectional output of the comparator 21 is applied to stabilize the frequency of oscillator 22 at the selected $m$th harmonic of frequency $\alpha$. Thus, the output frequency of oscillator 22 is adjustable, in the particular example above assumed, in steps of 75 megacycles by adjustment or setting of the frequency-divider 20. The frequency B is therefore adjusted in steps of 75 megacycles; and again, assuming the values and relations specifically discussed for Fig. 1, the frequency of oscillator 10 is adjustable in steps of 25 megacycles over a range from 6800 to 7200 megacycles. More generally, the operating frequency of the generator 10, at a particular time, is any selected one of the values defined in Equations 7 and 8.

Figures 4, 5, 6:
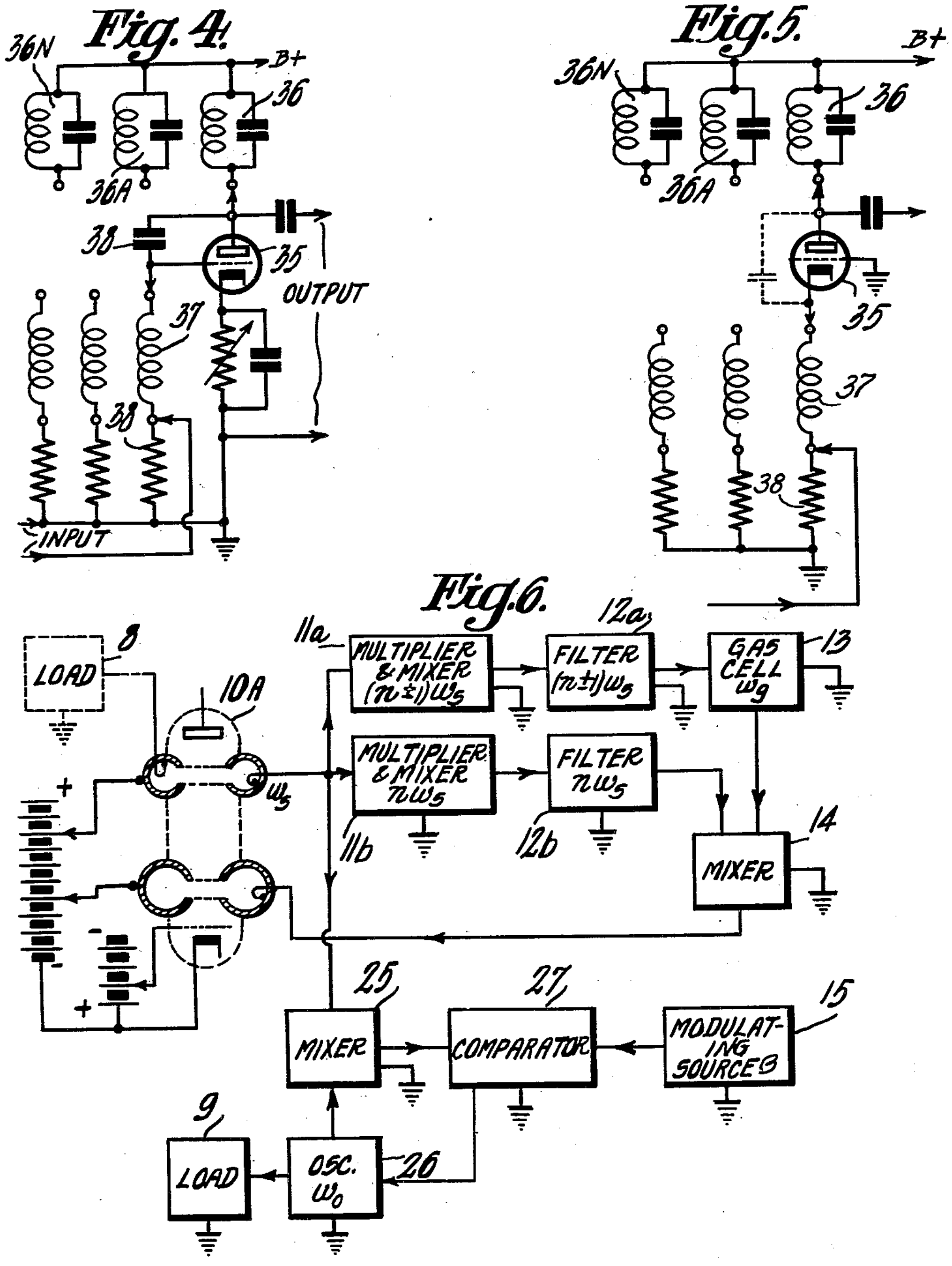
Figs. 4 and 5 are circuit diagrams of frequency-dividers utilizable in Figs. 2, 3, 7, 8 and 9.
Fig. 6 is a block diagram of a multi-channel microwave system in which the offset and channel-spacing frequencies are introduced externally of the feedback loop of a gas-line stabilized microwave oscillator.

A frequency-divider suitable for use as divider 20 of Figs. 2 and 3 is specifically shown and claimed in copending application Serial No. 207,187, now Patent No. 2,688,701, issued September 7, 1954. For completeness here, the frequency-divider 20 may be of the type shown in either of Fig. 4 and/or 5. In Fig. 4, the divider tube 35 of divider 20A is preferably a high-frequency triode, such as a pencil triode of the 5876 or 5675 type.

The output circuit of tube 35 is tuned or tunable to the desired subharmonic of the frequency applied to the input circuit of the tube. The output circuit may be a coil and condenser as shown or for the higher frequencies may be a cavity tuned by its distributed inductance and capacity. A series of such cavities or tuned circuits in number corresponding with half of the channel frequencies may be provided for quick substitution in the output circuit of tube 35 by a plug-in or switching arrangement.

The inductance 37 in the grid circuit of tube 35 is of high impedance at the subharmonic frequency to which output circuit is tuned. Preferably for optimum subharmonic output, the inductance 37 and capacitance 38 between the grid and anode of tube 35 are in series resonance at the desired subharmonic output frequency. The capacitance 38 may simply be the interelectrode capacity between the grid and anode of the tube or it may be supplemented by an external capacity. The resistance 39 in the grid circuit of tube 35 is of value selected or adjusted to give optimum stable subharmonic output. For rapid selection of different values of $m$, there may be provided a plurality of input inductances and resistances 37—39 which can be switched into circuit by a plug-in or switching arrangement. The grid inductances 37 may be coils, as shown, or they may be lengths of transmission line or sections of waveguide depending upon the frequencies involved.

The frequency-divider 20B of Fig. 5 uses a grounded grid circuit for which the so-called "lighthouse" or "disk-seal" type of tubes are particularly suited. Since the tube 35 employs a grounded grid circuit, the capacitor which series resonates with the inductance 37 is the anode-cathode interelectrode capacitor of the tube 35. In other respects the circuit is similar to that shown in Fig. 4 and the corresponding elements are identified by the same reference characters. For more complete discussion of these and other similar frequency-dividers suitable for use in multi-channel systems such as herein described, reference may be had to aforesaid copending application Serial No. 207,187, now Patent No. 2,688,701, issued September 7, 1954.

In the system of Fig. 1, the incrementally adjustable frequency B providing the equispaced microwave channels is introduced in the feedback circuit of the oscillator which generates the channel frequencies and which is also the generator stabilized from the gas line or equivalent high-Q standard. In the modifications subsequently described, the frequency B is combined with the output of a fixed frequency oscillator stabilized from a gas line and both are used to control the frequency of a second microwave oscillator which is thus incrementally variable to provide equispaced channel frequencies.

Referring to Fig. 6, the oscillator 10A is stabilized at a subharmonic of the resonant frequency of a gas or equivalent high-Q standard by a method and arrangement per se specifically disclosed and claimed in copending application Serial No. 218,808, now Patent No. 2,743,368, issued April 24, 1956. Specifically, the feedback loop of the oscillator 10A includes a mixer 14 having two input circuits upon which are respectively impressed two adjacent harmonics of the operating frequency $\omega_g$ of the generator 10A. One of these input circuits includes the gas cell 13, or equivalent high-Q standard, sharply resonant at a frequency corresponding with the desired value of the harmonic output of the filter in that input circuit. Thus, depending upon the input circuit in which the gas cell is included, the microwave oscillator 10A is stabilized at one of the frequencies $$\omega_s=\frac{\omega_g}{n\pm 1} \tag{9}$$

$$\omega_s=\frac{\omega_g}{n} \tag{10}$$

The fixed output frequency $\omega_g$ of oscillator 10A and the incrementally variable frequency $\omega_0$ of the output oscillator 26 are applied to a mixer 25 and the resulting difference frequency is applied to one input circuit of the phase-comparator 27 which may be of type disclosed in aforesaid application Serial No. 218,807. The output of oscillator 10A may be applied to a load 8. Upon the other input circuit of phase-comparator 27 are applied oscillations of relatively low frequency B incrementally adjustable to provide the desired channel spacing and also usually including the offset frequency $\Delta$ as a component. The reversible-polarity, unidirectional output of phase-comparator 27 is applied rigidly to stabilize the frequency of oscillator 26 in accordance with Equation 5 or 6, in which B is adjustable in steps in number corresponding with the number of channels on each side of the mean-frequency channel. The systems 15A and 15B of Figs. 7 and 8 for providing frequency B in Fig. 6 are similar to those shown in Figs. 2 and 3 and corresponding components are identified by the same reference characters.

Figure 7:
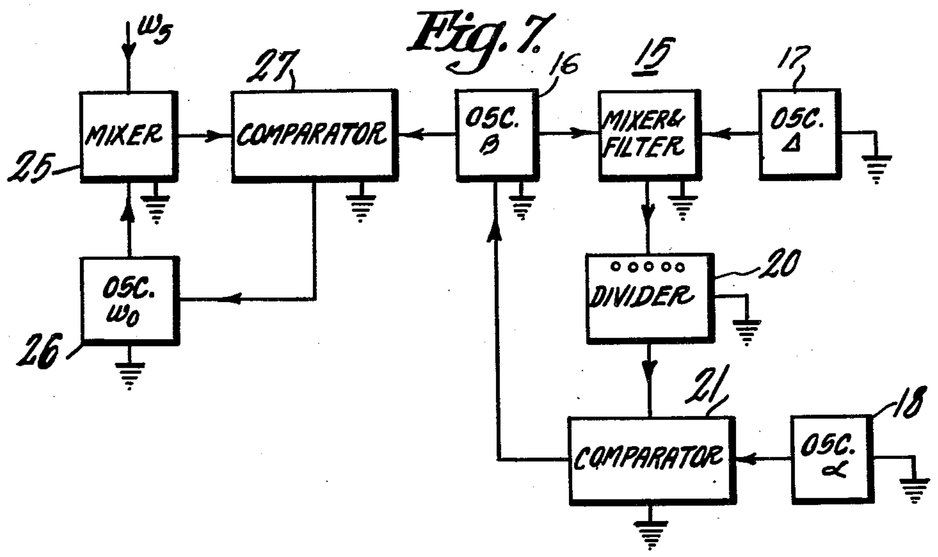
Figs. 7, 8 and 9 illustrate modifications of part of the system of Fig. 6.

Specifically in Fig. 7, the frequency B as applied to one input circuit of the phase-comparator 27 is produced by an oscillator 16 which is stabilized by the output of a phase comparator 21 upon one of whose input circuits is impressed the output of oscillator 18 generating frequency $\alpha$ and upon whose other input circuit is impressed the output of frequency divider 20. The input frequency of frequency-divider 20 is the algebraic sum of the frequencies of oscillators 16 and 17 as produced by the mixer 19. Thus, as in Fig. 2, the output of oscillator 16 is rigidly stabilized at a selected one of the values $\Delta \pm m\alpha$ (where $m$ is a selected integer) depending upon the setting of the dividing ratio $m$ of the frequency-divider 20, the adjustment of the filter of mixer 19 and the position of selector switch which tunes oscillator 16 to approximately the desired frequency so that control from comparator 21 occurs.

Figure 8:
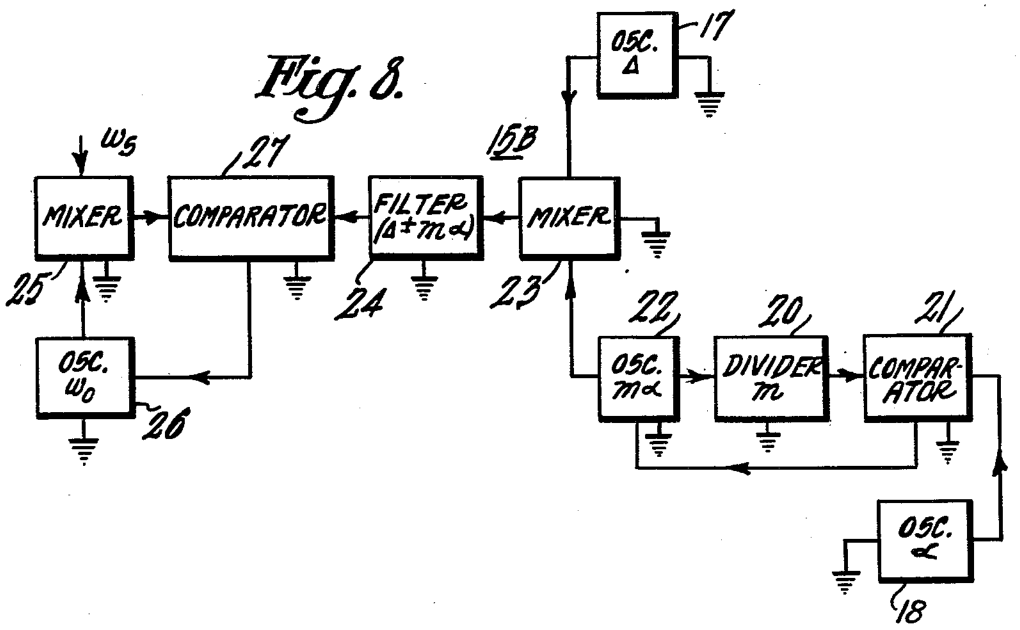

Alternately, as shown in Fig. 8, the frequency impressed upon one input circuit of the phase-comparator 27 may be a selected output component of a mixer 23 upon which are impressed the output frequencies of oscillators 17 and 22. Oscillator 17 may be a fixed frequency oscillator generating the frequency $\Delta$ and the output of oscillator 22 is a selected $m$th harmonic of the channel spacing oscillator 18.

With either of the arrangements 15A, 15B of Figs. 7, 8 used as the source 15 of Fig. 6, the multi-channel output oscillator 26 is stabilized in accordance with a selected one of the relations defined as follows:

Oscillator 10A is controlled at any of frequencies $$\omega_s = \frac{\omega_g}{n+1},\ \omega_s = \frac{\omega_g}{n-1},\ \text{or}\ \omega_s = \frac{\omega_g}{n}$$

from a microwave spectral line at frequency $\omega_g$. Oscillator 26 frequency is offset from oscillator 10A frequency by amount B through action of phase comparator 26. Oscillator 26 frequencies are therefore $$(11)\qquad \omega_o = \omega_g \pm (\Delta \pm m)$$

$$(12)\qquad \omega_o = \frac{\omega_g}{n+1} \pm (\Delta \pm m)$$

comparison of Equations 11, 12 with Equations 7, 8 indicates that there is no division of the offset and channel spacing frequencies by the factors $$\frac{1}{n \pm 1}\ \text{or}\ \frac{1}{n}$$

in Equations 11, 12 as there was in the case of Equations 7, 8. Therefore, for the specific example discussed in connection with Fig. 1, the offset frequency $\Delta$ would, in Fig. 6, be 95 megacycles and the channel-spacing frequency $\alpha$ would be 25 megacycles, to provide channels with 25 megacycle spacing and with a mean channel frequency of 7000 megacycles.

Figures 9, 10:
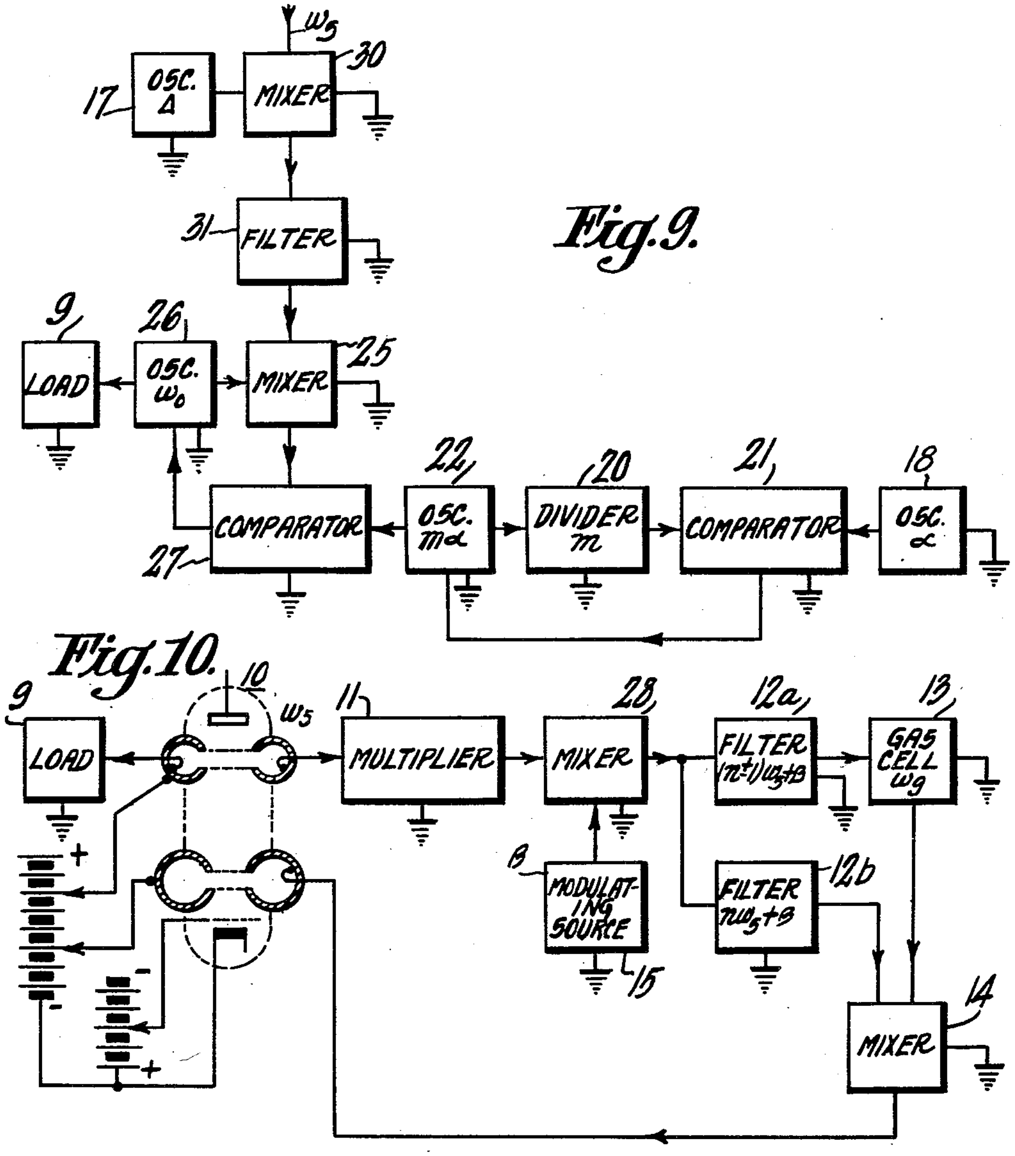
Fig. 10 illustrates a modification of the spectral line stabilizer part of the system which may be applied to the systems of Fig. 1 or Fig. 6.

Another arrangement, similar to Fig. 6 in that the offset and channel-spacing frequencies are external to the feedback loop of the gas-line stabilized oscillator, is shown in Fig. 9. As in Fig. 6, a fixed frequency microwave oscillator is stabilized at frequency $\omega_s$ which is a selected harmonic of a gas-line frequency $\omega_g$. This frequency $$\left(\omega_s = \frac{\omega_g}{n+1},\ \omega_s = \frac{\omega_g}{n-1}\right)\ \text{or}\ \left(\omega_s = \frac{\omega_g}{n}\right)$$

and the relatively low fixed offset frequency $\Delta$ as produced by generator 17 are applied to mixer 30 which may be a diode. The filter 31 selects one or the other of the resulting difference-frequencies ($\omega_s + \Delta$, $\omega_s - \Delta$) from the mixer output and applies it to mixer 25, which may also be a crystal diode.

Upon mixer 25 is also impressed the output of the channel-frequency oscillator 26 to be stabilized. The output of the mixer is impressed upon one input circuit of the phase-comparator 27. Upon the other input circuit of comparator 27 is impressed the output frequency $m\alpha$ of oscillator 22.

The output of phase-comparator 27 is applied as in Figs. 7 and 8 to stabilize the multi-channel oscillator 26 at a frequency $\omega_o$ whose major term ($\omega_s$) is rigidly stabilized at a fixed value from a gas-line standard and whose minor term includes the fixed offset frequency $\Delta$ and the incrementally adjustable frequency $m\alpha$. For this modification, the relations defining the operating frequency of oscillator 26 may again be defined by Equations 11, 12 as in the case of Fig. 6.

Again, as appears from comparison of Equations 11, 12 with Equations 7, 8, in the minor term of Equations 11, 12 unlike that of Equations 7, 8, there is no division of the offset and channel-spacing frequencies. Consequently for the specific example discussed in connection with Fig. 1, the offset frequency $\Delta$ would, in Fig. 9, be 95 megacycles and the channel-spacing frequency $\alpha$ would be 25 megacycles, to afford channels with 25 megacycles spacing and with a mean channel frequency of 7,000 megacycles.

In any of the foregoing modifications of Figs. 1 to 9, the oscillator 10 stabilized from a gas-line standard may be of the frequency-multiplying type in which case its feedback loop is of modified type specifically disclosed and claimed in my copending application Serial No. 223,280, now Patent No. 2,743,365, issued April 24, 1956.

It is also possible to use the modification shown in Fig. 10 to obtain output at frequencies $$\omega_s = \frac{\omega_g}{n \pm 1} + \frac{B}{n \pm 1}\ \text{or}\ \omega_s = \frac{\omega_g}{n} \pm \frac{B}{n}$$

stabilized by a spectral line or other high-Q frequency standard at $\omega_g$. Instead of using separate frequency multipliers as before, it is also possible to adjust some frequency multipliers 11 so as to give simultaneous output at both $(n \pm 1)\omega_s$ and at $n\omega_s$. It is also possible to combine frequency multiplier 11 and mixer 28 operations in a single diode. Filters 12a, 12b then select frequency components $(n \pm 1)\omega_s + B$ and $n\omega_s + B$, respectively.

What is claimed is:

1. A system for providing equispaced stabilized microwave frequencies comprising a microwave generator having an external feedback loop including a mixer whose output frequency $\omega_s$ corresponds with the operating frequency of the oscillator, means for generating a submicrowave frequency B incrementally adjustable in equal steps, frequency-multiplier and mixing means for producing the frequency $(n\omega_s \pm B)$ and at least one of the frequencies $[(n \pm 1)\omega_s \pm B]$, (where $n$ is an integer), two input circuits for said mixer respectively including filters respectively selectively passing one of the frequencies $(n\omega_s \pm B)$ and one of the frequencies $[(n \pm 1)\omega_s \pm B]$, and a high Q frequency standard included in one of said input circuits and sharply resonant at the desired value of the frequency passed by the filter of that input circuit.

2. A system as in claim 1 in which said means for generating the frequency B comprises a first oscillator generating frequency B, a second oscillator generating a fixed offset frequency $\Delta$, means including a mixer combining the outputs of said first and second oscillators to produce a selected one of the frequencies $(B \pm \Delta)$, a frequency-divider in the output of said mixer to produce a corresponding one of the frequencies $$\left(\frac{B \pm \Delta}{m}\right)$$

where $m$ is a selected integer, a third oscillator generating a fixed spacing frequency $\alpha$, and a comparator for comparing the phase of frequency $\alpha$ and the output frequency of said divider to produce a signal stabilizing the operating frequency B of the first oscillator at a selected one of the frequencies $(\Delta \pm m\alpha)$.

3. A system as in claim 1 in which said means for generating the frequency B comprises a first oscillator generating the fixed spacing frequency $\alpha$, a second oscillator, means including a frequency-divider and a phase-comparator for stabilizing said second oscillator at a frequency $m\alpha$, where $m$ is a selected integer, a third oscillator for generating a fixed offset frequency $\Delta$, and means including a mixer for combining the outputs of said second and third oscillators to produce frequency B having a selected one of the values $(\Delta \pm m\alpha)$.

4. A system as in claim 1 in which said frequency standard is a confined body of gas at low pressure and exhibiting molecular resonance at the selected one of the frequencies $(n\omega_s+B)$, $[(n+1)\omega_s+B]$, $[(n-1)\omega_s+B]$.

5. A system for providing equispaced stabilized microwave frequencies comprising: a circuit including a first oscillator stabilized at a microwave frequency which is the $n$th subharmonic of a high-Q frequency standard sharply resonant at frequency $\omega_g$; means including additional oscillator means for generating a submicrowave frequency B incrementally adjustable in equal steps, said means including said additional oscillator means for generating the frequency B comprising a first auxiliary oscillator generating the frequency B, a second auxiliary oscillator generating a fixed offset frequency $\Delta$, means including a mixer for combining the outputs of said first and second auxiliary oscillators to produce a selected one of the frequencies $(B\pm\Delta)$, a frequency-divider in the output of said mixer to produce a corresponding one of the frequencies $$\left(\frac{B\pm\Delta}{m}\right)$$

where $m$ is a selected integer, a third auxiliary oscillator generating a fixed spacing frequency $\alpha$, and a comparator for comparing the phase of frequency $\alpha$ and the output phase of said divider to produce a signal stabilizing the operating frequency of the first auxiliary oscillator at a selected one of the frequencies $(\Delta\pm m\alpha)$; a second oscillator for generating the frequency $\omega_0$; means including a mixer for combining the outputs of said first and second oscillators to produce a difference frequency: and a second comparator for comparing the phase of said difference and frequency B of said generating means to produce a signal stabilizing at operating frequency $\omega_0$ of the second oscillator at a selected one of the frequencies $$\left(\frac{\omega_g}{n}\pm B\right)$$

6. A system for providing equispaced stabilized microwave frequencies comprising: a circuit including a first oscillator stabilized at a microwave frequency which is the $n$th subharmonic of a high-Q frequency standard sharply resonant at frequency $\omega_g$; means including additional oscillator means for generating a submicrowave frequency B incrementally adjustable in equal steps, said means including said additional oscillator means for generating the frequency B comprising a first auxiliary oscillator generating a fixed spacing frequency $\alpha$, a second auxiliary oscillator, means including a frequency-divider for dividing the frequency of said second auxiliary oscillator output, and a phase comparator for comparing the first auxiliary oscillator output and said frequency divider output phases to produce a signal for stabilizing said second auxiliary oscillator at a frequency $m\alpha$, where $m$ is a selected integer, a third auxiliary oscillator for generating a fixed offset frequency $\Delta$, and means including a mixer for combining the outputs of said second and third auxiliary oscillators to produce frequency B having a selected one of the values $(\Delta\pm m\alpha)$; a second oscillator for generating the frequency $\omega_0$; means including a mixer for combining the outputs of said first and second oscillators to produce a difference frequency, and a second comparator for comparing the phase of said difference frequency and frequency B of said generating means to produce a signal stabilizing the operating frequency $\omega_0$ of the second oscillator at a selected one of the frequencies $$\left(\frac{\omega_g}{n}\pm B\right)$$

7. A system for providing equispaced stabilized microwave frequencies comprising: a microwave oscillator stabilized at a selected $n$th subharmonic of a high-Q frequency standard sharply resonant at frequency $\omega_g$; an oscillator for generating a fixed offset frequency $\Delta$, means including a mixer for combining the outputs of said offset frequency oscillator and said microwave oscillator to produce a difference frequency; means for generating the frequency $\omega_0$; means for combining said difference frequency appearing at the output of said mixer and frequency $\omega_0$ to produce a second difference frequency; means for generating the frequency $m\alpha$, where $m$ is a selected integer and $\alpha$ is a constant, said means comprising an auxiliary oscillator for generating a fixed spacing frequency $\alpha$, a second auxiliary oscillator, a frequency divider for dividing the second auxiliary oscillator frequency to provide the desired $m$th subharmonic of the second auxiliary oscillator frequency, and a comparator for comparing the phase of frequency $\alpha$ and said subharmonic to produce a signal for stabilizing the frequency of the second auxiliary oscillator at the frequency $m\alpha$; and a second comparator for comparing the phase of the second difference frequency and the phase at frequency $m\alpha$ to produce a signal stabilizing the frequency $\omega_0$ of the output oscillator at a selected one of the frequencies $$\left[\frac{\omega_g}{n}\pm(\Delta\pm m\alpha)\right]$$

References Cited in the file of this patent

UNITED STATES PATENTS

| | | |
|---|---|---|
| 2,464,818 | Learned | Mar. 22, 1949 |
| 2,521,070 | Lindner et al. | Sept. 5, 1950 |
| 2,555,150 | Norton | May 29, 1951 |
| 2,581,594 | MacSorley | Jan. 8, 1952 |
| 2,595,608 | Robinson et al. | May 6, 1952 |
| 2,663,798 | Hershberger | Dec. 22, 1953 |
| 2,699,503 | Lyons et al. | Jan. 11, 1955 |